US012686273B2

(12) United States Patent
Tsujino et al.

(10) Patent No.: US 12,686,273 B2
(45) Date of Patent: Jul. 21, 2026

(54) VEHICLE, VEHICLE DISPLAY CONTROL DEVICE, AND METHOD WITH VARIABLE GRAPHIC REPRESENTATION OF INTER-VEHICLE TIME AND DISTANCE

(71) Applicant: TOYOTA JIDOSHA KABUSHIKI KAISHA, Toyota (JP)

(72) Inventors: Miki Tsujino, Nagakute (JP); Sara Yamafuji, Miyoshi (JP); Makoto Suzuki, Seto (JP); Takatoshi Hattori, Nagoya (JP); Keigo Hori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 130 days.

(21) Appl. No.: 18/541,227

(22) Filed: Dec. 15, 2023

(65) Prior Publication Data

US 2024/0246419 A1     Jul. 25, 2024

(30) Foreign Application Priority Data

Jan. 20, 2023     (JP) ................................. 2023-007660

(51) Int. Cl.
*B60K 35/81*          (2024.01)
*B60K 35/28*          (2024.01)
*G06T 3/40*           (2024.01)
(52) U.S. Cl.
CPC .............. *B60K 35/81* (2024.01); *B60K 35/28* (2024.01); *G06T 3/40* (2013.01); *B60K 2360/167* (2024.01); *B60K 2360/1868* (2024.01)

(58) Field of Classification Search
None
See application file for complete search history.

(56) References Cited

U.S. PATENT DOCUMENTS

| | | | |
|---|---|---|---|
| 6,373,400 B1 * | 4/2002 | Fujita ..................... | B60K 35/10 |
| | | | 340/904 |
| 6,658,344 B2 * | 12/2003 | Hirasago ............... | B60W 30/16 |
| | | | 180/170 |
| 6,679,702 B1 * | 1/2004 | Rau .......................... | G09B 9/02 |
| | | | 434/62 |
| 8,559,675 B2 * | 10/2013 | Nogami ................. | G08G 1/166 |
| | | | 382/104 |
| 10,600,250 B2 * | 3/2020 | Nakano ................. | G06T 19/006 |
| 11,059,421 B2 * | 7/2021 | Ostapenko ............ | B60W 50/14 |

(Continued)

FOREIGN PATENT DOCUMENTS

| | | |
|---|---|---|
| JP | H1142957 A | 2/1999 |
| JP | 2002-219970 A | 8/2002 |
| JP | 2020-189549 A | 11/2020 |

*Primary Examiner* — Jason A Pringle-Parker
(74) *Attorney, Agent, or Firm* — Oliff PLC

(57) ABSTRACT

A vehicle display control device includes: a processor configured to: acquire a vehicle speed of a subject vehicle, an inter-vehicle distance to another vehicle traveling in front of the subject vehicle in a traveling direction, and at least one of a specified value or a detected value of an inter-vehicle time required for the subject vehicle to reach a position at which the other vehicle is present; and display inter-vehicle information indicating the specified value or the detected value of the inter-vehicle time and the inter-vehicle distance at a position corresponding to a forward side of the subject vehicle represented by a first icon in the traveling direction on a display equipped in the subject vehicle.

12 Claims, 7 Drawing Sheets

(56)  References Cited

U.S. PATENT DOCUMENTS

| | | | | |
|---|---|---|---|---|
| 12,131,412 | B2 * | 10/2024 | Maekawa | G09G 3/001 |
| 2007/0106475 | A1 * | 5/2007 | Kondoh | G06V 20/58 |
| | | | | 340/436 |
| 2015/0138087 | A1 * | 5/2015 | Kim | G02B 27/01 |
| | | | | 345/158 |
| 2015/0291160 | A1 * | 10/2015 | Kim | B60W 30/16 |
| | | | | 345/633 |
| 2016/0059697 | A1 * | 3/2016 | Ann | B60K 35/60 |
| | | | | 701/96 |
| 2016/0121794 | A1 * | 5/2016 | Iguchi | G02B 27/01 |
| | | | | 345/7 |
| 2016/0170487 | A1 * | 6/2016 | Saisho | G01C 21/3632 |
| | | | | 345/156 |
| 2016/0364621 | A1 * | 12/2016 | Hill | G06V 20/58 |
| 2017/0192091 | A1 * | 7/2017 | Felix | G01S 13/42 |
| 2017/0240109 | A1 * | 8/2017 | Kimura | G08G 1/167 |
| 2017/0261747 | A1 * | 9/2017 | Acklin | G01S 13/931 |
| 2017/0349177 | A1 * | 12/2017 | Andersson | B60W 30/16 |
| 2018/0023970 | A1 * | 1/2018 | Iguchi | B60K 35/234 |
| | | | | 345/7 |
| 2018/0174463 | A1 * | 6/2018 | Ohta | B60W 30/09 |
| 2018/0208201 | A1 * | 7/2018 | Hui | B60W 30/18163 |
| 2018/0286242 | A1 * | 10/2018 | Talamonti | B60K 35/60 |
| 2018/0297520 | A1 * | 10/2018 | Morimura | B60Q 9/008 |
| 2018/0345790 | A1 * | 12/2018 | Mimura | B60K 35/00 |
| 2018/0354509 | A1 * | 12/2018 | Mullins | B60K 35/80 |
| 2019/0294895 | A1 * | 9/2019 | Kleen | G06V 20/58 |
| 2019/0377359 | A1 * | 12/2019 | Lanke | G01C 21/3641 |
| 2020/0183157 | A1 * | 6/2020 | Suzuki | B60K 35/22 |
| 2020/0247412 | A1 * | 8/2020 | Wang | G02B 27/01 |
| 2020/0369151 | A1 | 11/2020 | Nakajima | |

* cited by examiner

| VEHICLE SPEED [km/h] | | 4 | 8 | 12 | 16 | 20 | ⋮ |
|---|---|---|---|---|---|---|---|
| INTER-VEHICLE DISTANCE [m] | INTER-VEHICLE TIME: LARGE | 8.2 | 11.3 | 14.0 | ⋮ | ⋮ | ⋮ |
| | INTER-VEHICLE TIME: MEDIUM | 6.2 | 8.5 | 10.5 | ⋮ | ⋮ | ⋮ |
| | INTER-VEHICLE TIME: SMALL | 4.9 | 6.7 | 8.1 | ⋮ | ⋮ | ⋮ |
| | INTER-VEHICLE TIME: MINIMUM | 4.0 | 5.4 | 6.6 | ⋮ | ⋮ | ⋮ |

VEHICLE, VEHICLE DISPLAY CONTROL DEVICE, AND METHOD WITH VARIABLE GRAPHIC REPRESENTATION OF INTER-VEHICLE TIME AND DISTANCE

CROSS-REFERENCE TO RELATED APPLICATION

This application claims priority to Japanese Patent Application No. 2023-007660 filed on Jan. 20, 2023, incorporated herein by reference in its entirety.

BACKGROUND

1. Technical Field

The present disclosure relates to a vehicle display control device, a vehicle, a vehicle display control method, and a non-transitory storage medium.

2. Description of Related Art

Japanese Unexamined Patent Application Publication No. 2020-189549 discloses a technology for displaying, on a display unit, a bar graph in which the length of a bar along an extension direction of a road varies according to an inter-vehicle distance which is information on the inter-vehicle distance to another vehicle traveling in front of a subject vehicle in a traveling direction.

SUMMARY

As a type of adaptive cruise control (ACC) that allows a subject vehicle to follow another vehicle, a type of ACC (hereinafter referred to as "inter-vehicle time control ACC") that controls travel such that the time (inter-vehicle time) required for a subject vehicle to reach a position at which another vehicle is present becomes a specified value has been known. With inter-vehicle time control ACC, an inter-vehicle distance from the other vehicle changes according to the vehicle speed. Therefore, when a bar graph that changes the length of a bar according to the inter-vehicle distance is displayed as in the technology disclosed in JP 2020-189549 A, a user may feel anxious about whether the inter-vehicle time control ACC is operating normally.

The present disclosure provides a vehicle display control device, a vehicle, a vehicle display control method, and a non-transitory storage medium that can make a user recognize that, while the inter-vehicle time control ACC is executed, the executed inter-vehicle time control ACC is operating normally.

A first aspect of the present disclosure relates to a vehicle display control device including a processor. The processor is configured to acquire a vehicle speed of a subject vehicle, an inter-vehicle distance to another vehicle traveling in front of the subject vehicle in a traveling direction, and at least one of a specified value or a detected value of an inter-vehicle time required for the subject vehicle to reach a position at which the other vehicle is present, and display inter-vehicle information indicating the specified value or the detected value of the inter-vehicle time and the inter-vehicle distance at a position corresponding to a forward side of the subject vehicle represented by a first icon in the traveling direction on a display equipped in the subject vehicle.

In the first aspect, in the display, the inter-vehicle information representing the specified value or the detected value of the inter-vehicle time and the inter-vehicle distance is displayed at the position corresponding to the forward side of the subject vehicle represented by the first icon in the traveling direction of the subject vehicle. As a result, when the inter-vehicle time control ACC is executed, even when the inter-vehicle distance changes as the vehicle speed changes, a user can be made to recognize that (the specified value or the detected value of) the inter-vehicle time indicated by the inter-vehicle information does not change. Thus, the user can be made to recognize that the inter-vehicle time control ACC is operating normally.

In the first aspect, the processor may be configured to display a graphic group in which partial graphics are arranged along a predetermined direction corresponding to the traveling direction on the display as the inter-vehicle information, and change the number of the partial graphics included in the graphic group according to the specified value or the detected value of the inter-vehicle time.

In the configuration, the graphic group in which the partial graphics are arranged along the predetermined direction corresponding to the traveling direction is displayed on the display, and the number of the partial graphics to be displayed is changed according to the specified value or the detected value of the inter-vehicle time. Therefore, the user can intuitively grasp the specified value or the detected value of the inter-vehicle time from the number of partial graphics included in the graphic group.

In the first aspect, the processor may be configured to increase the number of the partial graphics as the specified value or the detected value of the inter-vehicle time increases.

With the configuration, it is possible for a user to intuitively grasp a nature of change in the specified value or the detected value of the inter-vehicle time when the specified value or the detected value of the inter-vehicle time changes, from the increase or decrease in the number of partial graphics.

In the first aspect, the processor may be configured to display a graphic group in which partial graphics are arranged along a predetermined direction corresponding to the traveling direction on the display as the inter-vehicle information, and change a total size of the graphic group along the predetermined direction according to the inter-vehicle distance.

In the configuration, the graphic group in which partial graphics are arranged along the predetermined direction corresponding to the traveling direction is displayed on the display, and the total size of the graphic group along the predetermined direction is changed according to the inter-vehicle distance. Therefore, the user can intuitively grasp the inter-vehicle distance from the total size of the graphic group along the predetermined direction.

In the first aspect, the processor may be configured such that the total size of the graphic group along the predetermined direction increases as the inter-vehicle distance increases.

With the configuration, it is possible for the user to intuitively grasp the nature of change in the inter-vehicle distance when the inter-vehicle distance changes, from the change in the total size of the graphic group along the predetermined direction.

In the first aspect, the processor may be configured to display a second icon representing the other vehicle at a position according to the inter-vehicle distance in the display.

In the configuration, the second icon representing the other vehicle is displayed at the position corresponding to the inter-vehicle distance in the display. Therefore, the user can be made to more clearly recognize that the display on the display simulates the situation in the traveling direction side of the subject vehicle.

A second aspect of the disclosure relates to a vehicle including the vehicle display control device according to the first aspect, and a processor. The processor is configured to receive the specified value of the inter-vehicle time, and control travel of the subject vehicle such that the detected value of the inter-vehicle time corresponds to the specified value of the inter-vehicle time.

With the second aspect, similar to the first aspect, the user can be made to recognize that the inter-vehicle time control ACC is operating normally.

A third aspect of the present disclosure relates to a vehicle display control method that is executed by a computer, the vehicle display control method including the steps of acquiring a vehicle speed of a subject vehicle, an inter-vehicle distance to another vehicle traveling in front of the subject vehicle in a traveling direction, and at least one of a specified value or a detected value of an inter-vehicle time required for the subject vehicle to reach a position at which the other vehicle is present, and displaying inter-vehicle information indicating the specified value or the detected value of the inter-vehicle time and the inter-vehicle distance at a position corresponding to a forward side of the subject vehicle represented by a first icon in the traveling direction on a display equipped in the subject vehicle.

With the third aspect, similar to the first aspect, the user can be made to recognize that the inter-vehicle time control ACC is operating normally.

A fourth aspect of the present disclosure relates to a non-transitory storage medium storing instructions that are executable by a computer and that cause the computer to perform functions. The functions include the steps of acquiring a vehicle speed of a subject vehicle, an inter-vehicle distance to another vehicle traveling in front of the subject vehicle in a traveling direction, and at least one of a specified value or a detected value of an inter-vehicle time required for the subject vehicle to reach a position at which the other vehicle is present, and displaying inter-vehicle information indicating the specified value or the detected value of the inter-vehicle time and the inter-vehicle distance at a position corresponding to a forward side of the subject vehicle represented by a first icon in the traveling direction on a display equipped in the subject vehicle.

With the fourth aspect, similar to the first aspect, the user can be made to recognize that the inter-vehicle time control ACC is operating normally.

Each aspect of the present disclosure has the effect of being able to make a user recognize that the inter-vehicle time control ACC is operating normally.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram illustrating a schematic configuration of an in-vehicle system according to an embodiment;

FIG. 3 is a chart illustrating an example of a conversion table of inter-vehicle time-inter-vehicle distance;

DETAILED DESCRIPTION OF EMBODIMENTS

Figure 1:
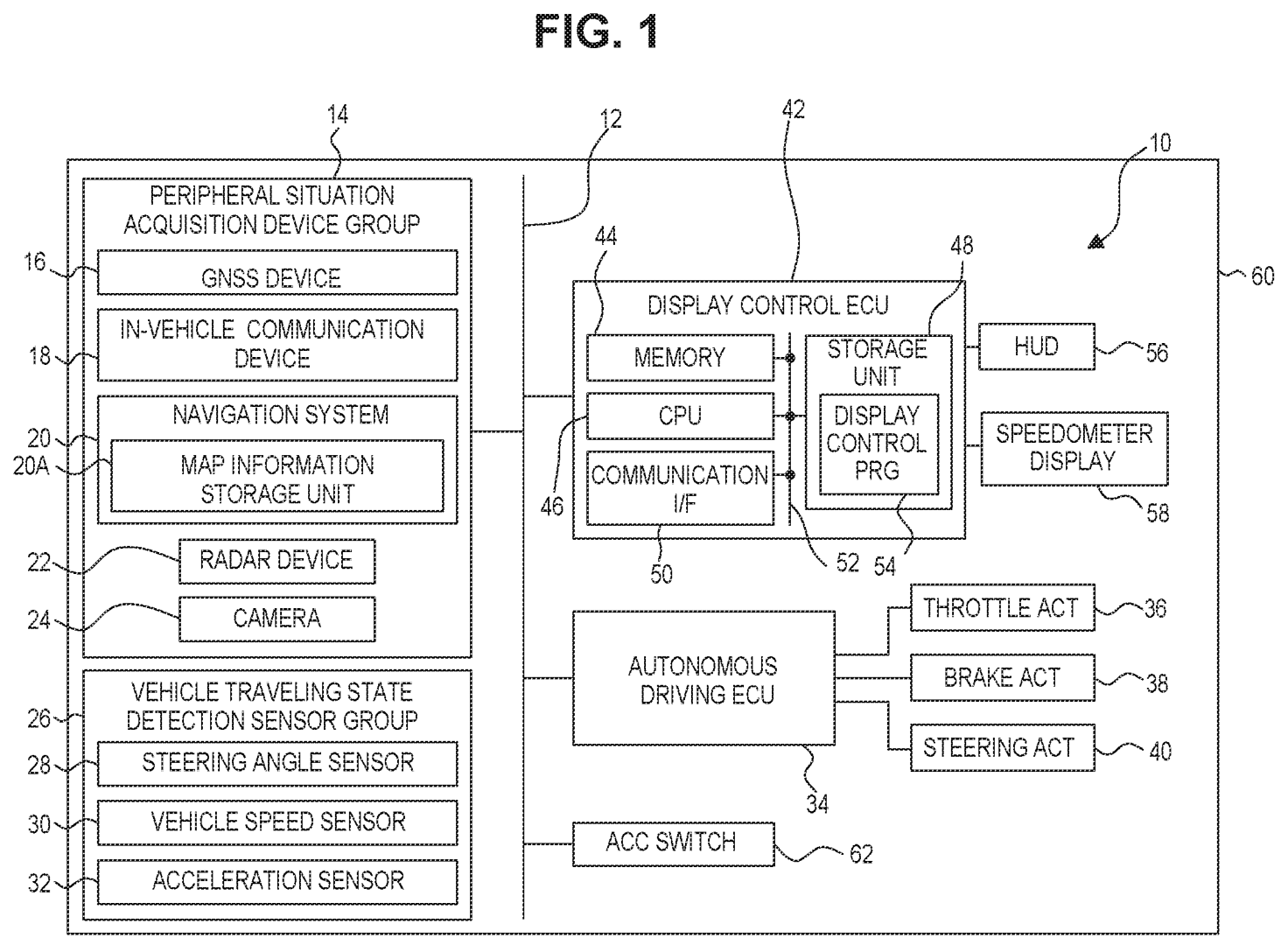
Figure 2:
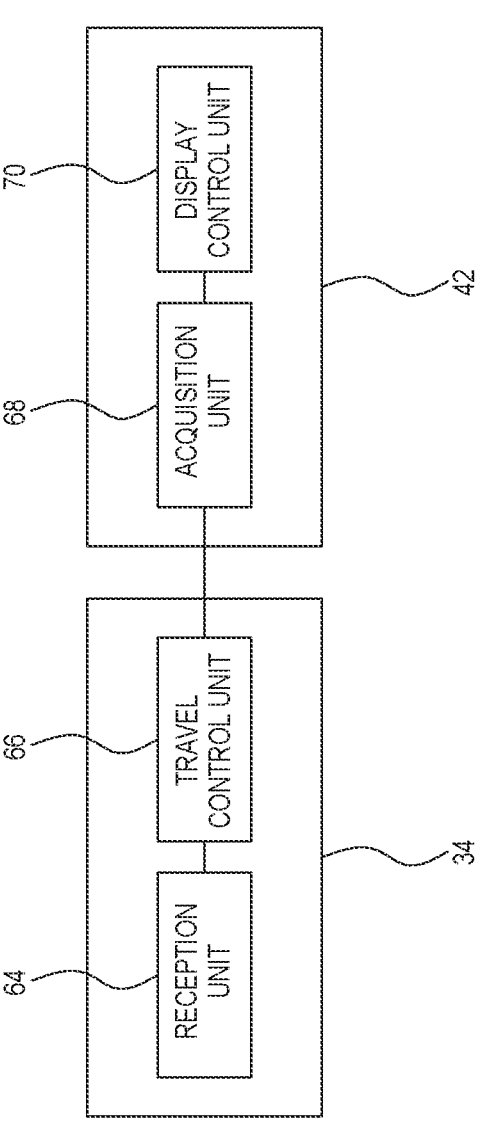
FIG. 2 is a functional block diagram of an autonomous driving ECU and a display control ECU.

An example of an embodiment of the present disclosure will be described in detail below with reference to the drawings. FIG. 1 illustrates an in-vehicle system 10 installed in a subject vehicle 60. The in-vehicle system 10 includes a communication bus 12, and a peripheral situation acquisition device group 14, a vehicle traveling state detection sensor group 26, an ACC switch 62, an autonomous driving electronic control unit (ECU) 34, and a display control ECU 42 are each connected to the communication bus 12. FIG. 1 illustrates only part of the in-vehicle system 10. In addition, the vehicle 60 on which the in-vehicle system 10 is mounted is hereinafter referred to as the subject vehicle 60. The subject vehicle 60 is an example of a vehicle according to the present disclosure.

The peripheral situation acquisition device group 14 includes a global navigation satellite system (GNSS) device 16, an in-vehicle communication device 18, a navigation system 20, a radar device 22, a camera 24, and the like as devices that acquire information representing the situation of the surrounding environment of the subject vehicle 60.

The GNSS device 16 receives GNSS signals from a plurality of GNSS satellites and measures the position of the subject vehicle 60. The in-vehicle communication device 18 is a communication device that performs at least one of vehicle-to-vehicle communication with other vehicles and road-to-vehicle communication with a roadside device. The navigation system 20 includes a map information storage unit 20A that stores map information. The navigation system 20 displays the position of the subject vehicle 60 on a map and provides guidance on a route to a destination based on the position information obtained from the GNSS device 16 and the map information stored in the map information storage unit 20A.

The radar device 22 detects objects such as pedestrians and other vehicles existing around the subject vehicle 60 as point group information, and acquires the relative positions and relative speeds of the detected objects and the subject vehicle 60. Based on changes in the relative position and relative speed between each object and the subject vehicle, included in the latest multiple detection results, the radar device 22 excludes noises and roadside objects such as guardrails from the objects to be monitored, and performs follow-up monitoring on specific objects such as pedestrians and other vehicles as objects to be monitored. Then, the radar device 22 outputs information such as the relative position and relative speed with respect to each object to be monitored. The camera 24 photographs the surroundings of the subject vehicle 60 with a plurality of cameras and outputs the photographed images.

The vehicle traveling state detection sensor group 26 includes, as a plurality of sensors for acquiring the traveling state of the subject vehicle 60, a steering angle sensor 28 that detects the steering angle of the subject vehicle 60, a vehicle speed sensor 30 that detects the traveling speed of the subject vehicle 60, and an acceleration sensor 32 that detects the acceleration applied to the subject vehicle 60.

The ACC switch 62 is a switch that enables inter-vehicle time control ACC to switch between On and Off and can set a specified value of the inter-vehicle time in the inter-vehicle time control ACC. The ACC switch 62 may be a physical switch or a virtual switch.

The autonomous driving ECU 34 is connected to a throttle ACT 36 for changing a throttle opening of the subject vehicle 60 and a brake ACT 38 for changing a braking force generated by a braking device of the subject vehicle 60. Further, the autonomous driving ECU 34 is connected to a steering ACT 40 that changes a steering input by a steering device of the subject vehicle 60. The autonomous driving ECU 34 is an ECU that performs autonomous driving processing to autonomously drive the subject vehicle 60 without any driving operation by an occupant of the subject vehicle 60. An example of autonomous driving processing is the inter-vehicle time control ACC.

The autonomous driving ECU 34 includes a central processing unit (CPU), a memory such as a read only memory (ROM) and a random access memory (RAM), a non-volatile storage unit such as a hard disk drive (HDD) and a solid state drive (SSD), and a communication interface (I/F). Autonomous driving software is stored in the storage unit. The autonomous driving ECU 34 functions as a reception unit 64 and a travel control unit 66 illustrated in FIG. 2 by the CPU executing the autonomous driving software.

The reception unit 64 receives a specified value of the inter-vehicle time in the inter-vehicle time control ACC set via the ACC switch 62. In the present embodiment, as illustrated in FIG. 3 as an example, the level of the inter-vehicle time is divided into four stages of "large", "medium", "small", and "minimum", and the reception unit 64 receives information indicating which of the above four stages is specified as the specified value of the inter-vehicle time.

When the inter-vehicle time control ACC is turned on via the ACC switch 62, the travel control unit 66 controls travel of the subject vehicle 60 such that a detected value of the inter-vehicle time to another vehicle (hereinafter referred to as a "preceding vehicle of a following target") traveling in front of the subject vehicle 60 in a traveling direction corresponds to a specified value of the inter-vehicle time received by the reception unit 64. Specifically, by controlling the throttle ACT 36, the brake ACT 38, and the steering ACT 40 based on information obtained from the peripheral situation acquisition device group 14 and the vehicle traveling state detection sensor group 26 such that the detected value of the inter-vehicle time to the preceding vehicle of the following target corresponds to the specified value of the inter-vehicle time set via the reception unit 64, the inter-vehicle time control ACC is performed to control the traveling of the subject vehicle 60 such that the subject vehicle 60 follows the preceding vehicle of the following target.

Control such that the detected value of the inter-vehicle time to the preceding vehicle of the following target corresponds to the specified value of the inter-vehicle time can be realized, for example, by the following control. That is, the relationship between the specified value of the inter-vehicle time and the inter-vehicle distance is defined in advance for each vehicle speed, for example, in a conversion table illustrated in FIG. 3, and then using this conversion table, a target value (an example of the specified value of the inter-vehicle time) of the inter-vehicle distance corresponding to the vehicle speed and the specified values of the inter-vehicle time is obtained. Then, control may be performed such that the detected value (an example of the detected value of the inter-vehicle time) of the inter-vehicle distance between the following target vehicle and the subject vehicle coincides with the target value of the inter-vehicle distance.

A head-up display (hereinafter referred to as HUD) 56 and a speedometer display 58 are connected to the display control ECU 42. The display control ECU 42 is an ECU that controls information display on the HUD 56 and the speedometer display 58. The HUD 56 according to the present embodiment is a small HUD of which the display range (an image is formed in the foreground and below) is a part of the front field of view of an occupant of the subject vehicle 60 by reflection on a windshield glass or the like. In addition, the speedometer display 58 is a display provided on an instrument panel of the subject vehicle 60.

The display control ECU 42 also includes a CPU 44, a memory 46 such as a ROM and a RAM, a non-volatile storage unit 48 such as an HDD and an SSD, and a communication I/F 50. The CPU 44, the memory 46, the storage unit 48, and the communication I/F 50 are connected via an internal bus 52 so as to be able to communicate with each other. A display control program 54 is stored in the storage unit 48 of the display control ECU 42. The display control ECU 42 functions as an acquisition unit 68 and a display control unit 70 illustrated in FIG. 2 by reading the display control program 54 from the storage unit 48, loading the display control program 54 in the memory 46, and executing the display control program 54 using the CPU 44, and performs display control processing (FIG. 4), which will be described below. The display control program 54 is an example of a vehicle display control program according to the present disclosure.

The acquisition unit 68 acquires the vehicle speed of the subject vehicle 60 from the vehicle speed sensor 30, acquires the inter-vehicle distance from another vehicle (the preceding vehicle of the following target) traveling in front of the subject vehicle 60 in the traveling direction from the radar device 22, and acquires the specified value of the inter-vehicle time to the other vehicle from the ACC switch 62.

The display control unit 70 causes the speedometer display 58 to display a first icon representing the subject vehicle 60. In addition, the display control unit 70 displays, at a position corresponding to the forward side in the traveling direction of the subject vehicle 60 of the first icon representing the subject vehicle 60 in the speedometer display 58, inter-vehicle information indicating the specified value of the inter-vehicle time and the inter-vehicle distance from the other vehicle. The display control ECU 42 is an example of a vehicle display control device according to the present disclosure, and the speedometer display 58 is an example of a display unit according to the present disclosure.

Figure 4:
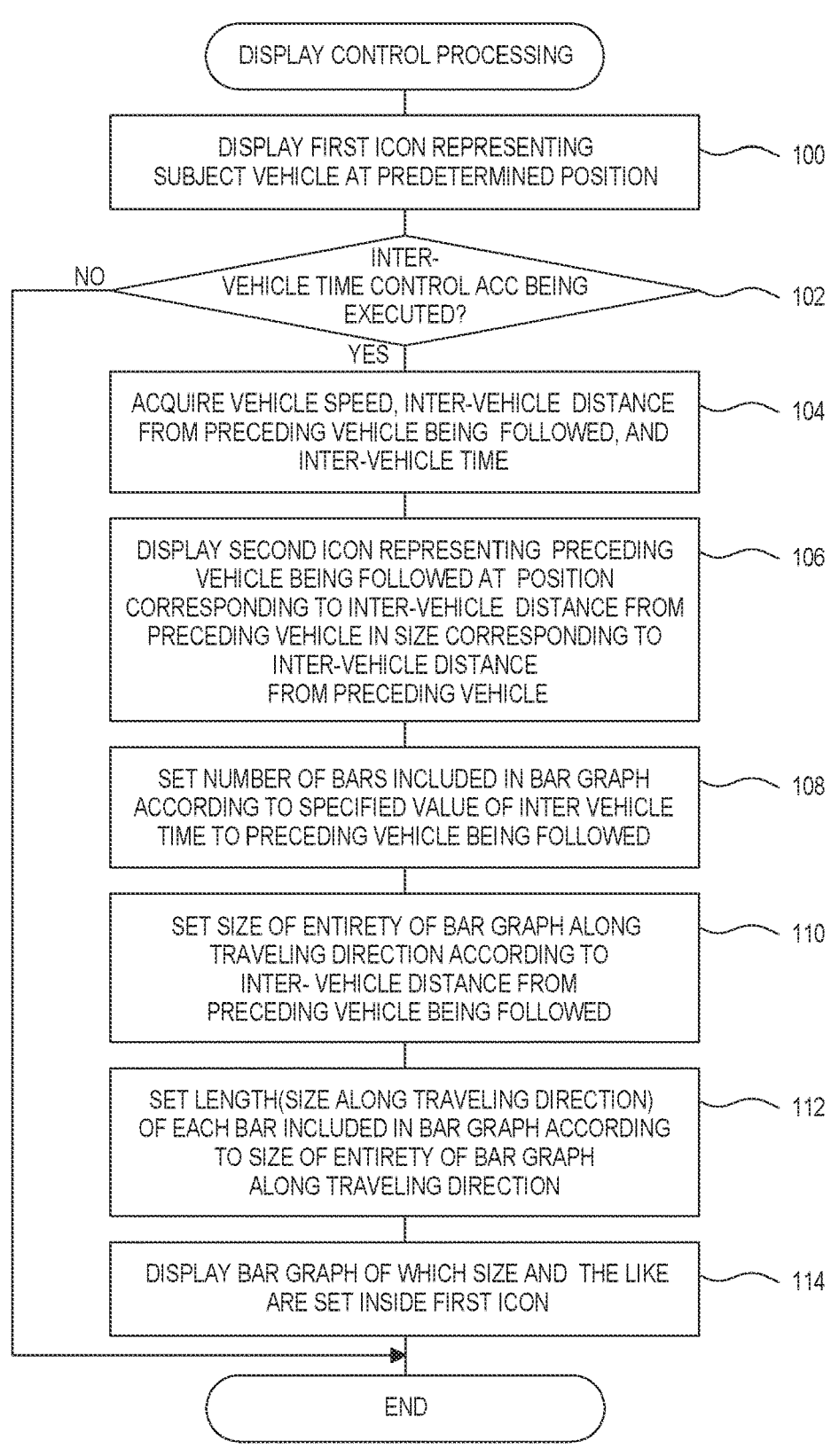
FIG. 4 is a flowchart illustrating display control processing executed by a display control ECU.

Next, as an operation of the present embodiment, display control processing executed by the display control ECU 42 will be described with reference to FIG. 4. This display control processing is repeatedly executed by the display control ECU 42 at predetermined time intervals. In step 100 of the display control processing, the display control unit 70 displays a first icon 72 (FIGS. 5 and 6) representing the subject vehicle 60 at a predetermined position in the display area of the speedometer display 58 and also displays information such as vehicle speed and time within the display area of the speedometer display 58.

In step 102, the display control unit 70 determines whether the inter-vehicle time control ACC is being executed by the autonomous driving ECU 34 based on whether the inter-vehicle time control ACC is turned on via the ACC switch 62. When the determination in step 102 is negative, display control processing is terminated. Further, when the inter-vehicle time control ACC is being executed by the autonomous driving ECU 34, the determination in step 102 is positive and the process proceeds to step 104.

In step 104, the acquisition unit 68 acquires the vehicle speed of the subject vehicle 60 from the vehicle speed sensor 30, acquires the inter-vehicle distance to the preceding vehicle of the following target from the radar device 22, and acquires the specified value of the inter-vehicle time to the preceding vehicle of the following target from the ACC switch 62.

Figure 5:
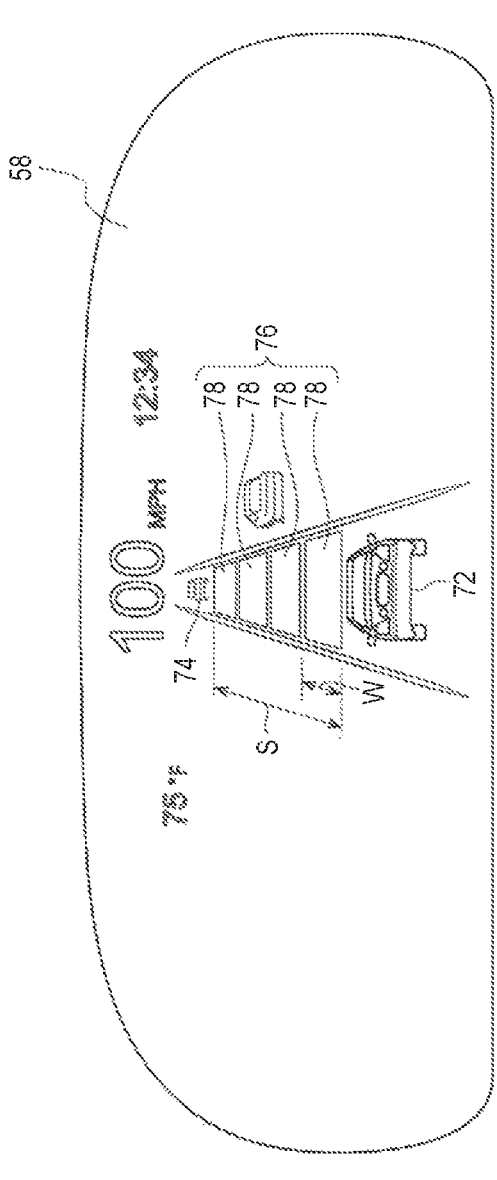
FIG. 5 is an image diagram illustrating an example of a display on a display unit when inter-vehicle time control ACC is being executed.
Figure 6:
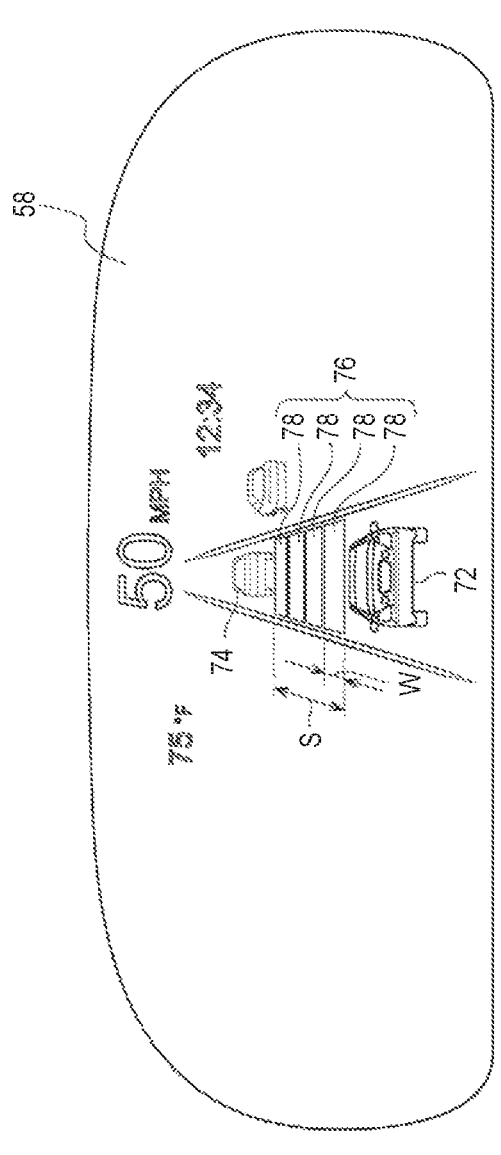
FIG. 6 is an image diagram illustrating an example of a display on the display unit when the inter-vehicle time control ACC is being executed.

In step 106, the display control unit 70 displays a second icon 74 (see FIGS. 5 and 6) representing the preceding vehicle of the following target on the display area of the speedometer display 58 at a position corresponding to the inter-vehicle distance to the preceding vehicle of the following target and at a size corresponding to the inter-vehicle distance to the preceding vehicle of the following target. FIG. 5 illustrates the display of the speedometer display 58 when the speed of the subject vehicle 60 is "100" as an example, and FIG. 6 illustrates the display of the speedometer display 58 when the speed of the subject vehicle 60 is "50" as an example. As is clear from comparing FIG. 5 with FIG. 6, as the inter-vehicle distance from the subject vehicle 60 increases, the size of the second icon 74 reduces, and the second icon 74 is displayed at a position separated from the first icon 72.

In addition, in the present embodiment, as an example of inter-vehicle information indicating the specified value of the inter-vehicle time and the inter-vehicle distance, as illustrated in FIGS. 5 and 6, a bar graph 76 in which one or more bars 78 extending along a first direction corresponding to a width direction of the subject vehicle 60 are aligned along a second direction corresponding to the traveling direction of the subject vehicle 60 is displayed on the speedometer display 58. The bar graph 76 is an example of a graphic group in the present disclosure, and each bar 78 included in the bar graph 76 is an example of a partial graphic in the present disclosure.

In step 108, the display control unit 70 sets the number of bars 78 included in the bar graph 76 to be displayed on the speedometer display 58 according to the specified value of the inter-vehicle time to the preceding vehicle being followed. In the present embodiment, the level of the inter-vehicle time is divided into four stages of "large", "medium", "small", and "minimum". In this case, for example, when the specified value of the inter-vehicle time is "large", the number of bars 78 included in the bar graph 76 can be set to "4", when the specified value of the inter-vehicle time is "medium", the number of bars 78 included in the bar graph 76 can be set to "3", when the specified value of the inter-vehicle time is "small", the number of bars 78 included in the bar graph 76 can be set to "2", and when the specified value of the inter-vehicle time is "minimum", the number of bars 78 included in the bar graph 76 can be set to "1".

In the next step 110, the display control unit 70 sets a size S (see FIGS. 5 and 6) of the entirety of the bar graph 76 along the second direction corresponding to the traveling direction according to the inter-vehicle distance to the preceding vehicle being followed. Specifically, the size S of the entirety of the bar graph 76 increases as the inter-vehicle distance to the preceding vehicle being followed increases.

In step 112, the display control unit 70 sets a length W (see FIGS. 5 and 6, size along the second direction corresponding to the traveling direction) of each bar 78 included in the bar graph 76 according to the total size of the bar graph 76 along the second direction corresponding to the traveling direction. Specifically, the length W of each bar 78 included in the bar graph 76 increases as the size S of the entirety of the bar graph 76 increases.

Then, in step 114, the display control unit 70 displays the bar graph 76 of which the size and the like are set in steps 108 to 112 in front (between the first icon 72 and the second icon 74) of the first icon 72 in the traveling direction of the subject vehicle 60 on the display area of the speedometer display 58. After performing the processing of step 114, the display control processing ends.

As described above, the display control ECU 42 functions as the acquisition unit 68 and the display control unit 70 in the present embodiment. The acquisition unit 68 acquires the vehicle speed of the subject vehicle 60, the inter-vehicle distance from another vehicle traveling ahead in the traveling direction of the subject vehicle 60, and a specified value of the inter-vehicle time required for the subject vehicle 60 to reach a position at which the other vehicle is present. Then, the display control unit 70 displays, on the speedometer display 58, inter-vehicle information (bar graph 76) representing the specified value of the inter-vehicle time and the inter-vehicle distance at the position corresponding to the forward side of the first icon 72 representing the subject vehicle 60 in the traveling direction of the subject vehicle 60. As a result, when the inter-vehicle time control ACC is executed by the autonomous driving ECU 34, even when the inter-vehicle distance changes as the vehicle speed changes, a user can be made to recognize that the specified value of the inter-vehicle time indicated by the inter-vehicle information does not change. Thus, the user can be made to recognize that the inter-vehicle time control ACC being executed is operating normally.

In addition, in the present embodiment, the display control unit 70 displays the graphic group (bar graph 76) in which the partial graphics (bars 78) are arranged along a predetermined direction corresponding to the traveling direction as the inter-vehicle information, and changes the number of the partial graphics (bars 78) included in the graphic group (bar graph 76) according to the specified value of the inter-vehicle time. As a result, the user can intuitively grasp the specified value of the inter-vehicle time from the number of partial graphics (bars 78) included in the graphic group (bar graph 76).

In addition, in the present embodiment, the display control unit 70 increases the number of the partial graphics (bars 78) as the specified value of the inter-vehicle time increases. As a result, the user can intuitively grasp the nature of change in the specified value of the inter-vehicle time when the specified value of the inter-vehicle time is changed, from the increase or decrease in the number of partial graphics (bars 78).

In addition, in the present embodiment, the display control unit 70 displays the graphic group (bar graph 76) in which the partial graphics (bars 78) are arranged along a predetermined direction corresponding to the traveling direction as the inter-vehicle information, and changes the total size of the graphic group (bar graph 76) along the predetermined direction according to the inter-vehicle distance. As a result, the user can intuitively grasp the inter-vehicle distance from the total size of the graphic group (bar graph 76) along the predetermined direction.

In addition, in the present embodiment, the display control unit 70 increases the total size of the graphic group (bar graph 76) along the predetermined direction as the inter-vehicle distance increases. This allows the user to intuitively grasp the nature of change in the inter-vehicle distance when the inter-vehicle distance changes, from the change in the total size of the graphic group (bar graph 76) along the predetermined direction.

Further, in the present embodiment, the display control unit 70 causes the second icon 74 representing the other vehicle to be displayed on the speedometer display 58 at a position corresponding to the inter-vehicle distance. This allows the user to more clearly recognize that the display on the speedometer display 58 is a display that simulates the situation in a traveling direction side of the subject vehicle 60.

Figure 7:
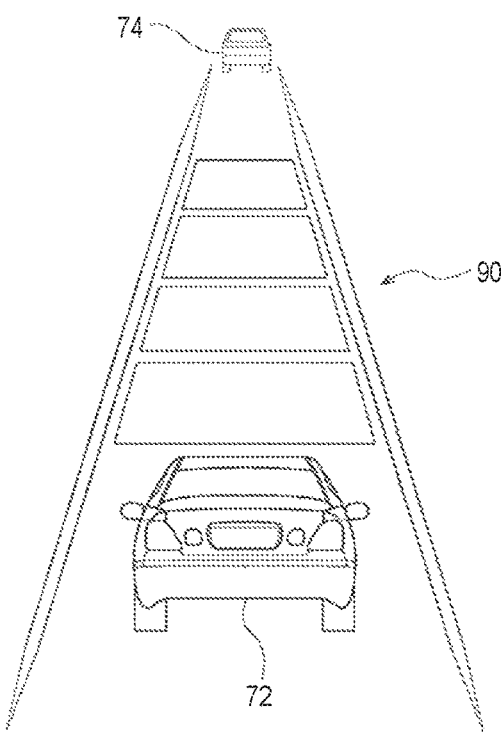
FIG. 7 is an image diagram illustrating a state in which an icon representing a preceding vehicle is separated from a bar graph.
Figure 8:
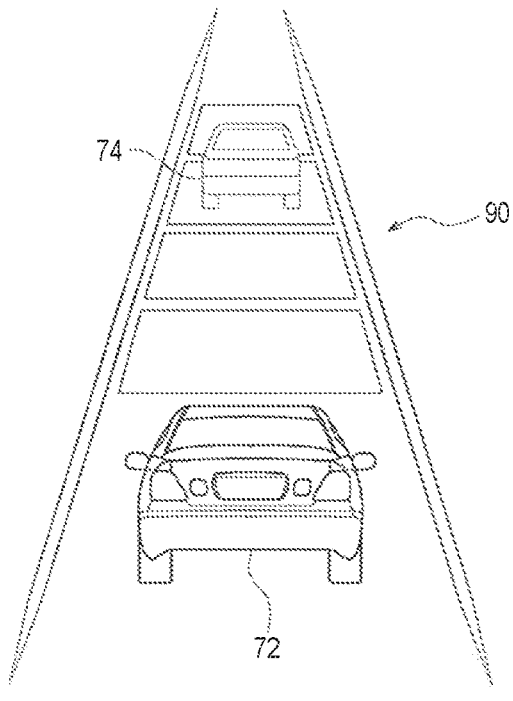
FIG. 8 is an image diagram illustrating a state in which the icon representing the preceding vehicle and the bar graph are superimposed.

In addition, it is possible to consider a case where while the inter-vehicle time control ACC is executing, the second icon 74 representing the preceding vehicle of the following target is displayed at the position corresponding to the inter-vehicle distance between the preceding vehicle and the subject vehicle 60, and the bar graph 90 representing the specified value of the inter-vehicle time is displayed between the first icon 72 representing the subject vehicle and the second icon. In this case, since the inter-vehicle distance between the preceding vehicle and the subject vehicle 60 changes according to the vehicle speed, as illustrated in FIG. 7, the bar graph 90 and the second icon 74 are separated to form a gap according to changes in vehicle speed, and as illustrated in FIG. 8, the bar graph 90 and the second icon 74 may be superimposed and displayed. The display states illustrated in FIGS. 7 and 8 may cause the user to feel anxious and confused.

On the other hand, in the present embodiment, between the first icon 72 and the second icon, the bar graph 76 representing the specified value of the inter-vehicle time and the inter-vehicle distance is displayed. In addition, the number of bars 78 included in the bar graph 76 changes according to the specified value of the inter-vehicle time, and the total size of the bar graph 76 along the direction corresponding to the traveling direction is changed according to the inter-vehicle distance. This prevents the occurrence of the gap between the second icon and the bar graph 76 and the superimposing display of the second icon and the bar graph 76, thereby preventing the user from feeling anxious and confused for the user. In addition, the number of bars 78 corresponds to the specified value of the inter-vehicle time, and the total size of the bar graph 76 corresponds to the inter-vehicle distance, which can be intuitively recognized by the user. Therefore, it is possible to effectively assist the user in recognizing the situation of the subject vehicle and the preceding vehicle.

The subject vehicle 60 according to the present embodiment also includes the display control ECU 42 functioning as the acquisition unit 68 and the display control unit 70 described above, and the autonomous driving ECU 34 functioning as the reception unit 64 and travel control unit 66. The reception unit 64 receives a specified value of the inter-vehicle time. Further, the travel control unit 66 controls traveling of the subject vehicle 60 such that the detected value of the inter-vehicle time corresponds to the specified value of the inter-vehicle time. As a result, when the autonomous driving ECU 34 is executing the inter-vehicle time control ACC, the user can be made to recognize that the inter-vehicle time control ACC being executed is operating normally.

In the embodiment described above, an aspect is described in which the level of the inter-vehicle time is divided into four stages of "large", "medium", "small", and "minimum", and the specified value of the inter-vehicle time is selected from among these four stages of the inter-vehicle time level. However, the number of divisions of the inter-vehicle time level may be three or less or five or more. Further, the specified value of the inter-vehicle time may be information specifying the inter-vehicle time numerically.

Further, in the embodiment described above, as an example of the inter-vehicle information in the present disclosure, an aspect is described in which the bar graph 76 representing the inter-vehicle distance and the specified value of the inter-vehicle time is displayed on the display unit (speedometer display 58). However, the inter-vehicle information in the present disclosure may be information representing a detected value of the inter-vehicle time instead of the specified value of the inter-vehicle time. In this case, the detected value of the inter-vehicle time can be obtained as follows. For example, a relationship between the inter-vehicle distance to the preceding vehicle being followed and the detected value of the inter-vehicle time is defined for each vehicle speed using a conversion table as illustrated in FIG. 3, an arithmetic expression, or the like, then the detected value of the inter-vehicle time is derived using the above relationship from the vehicle speed and the detected value of the inter-vehicle distance to the preceding vehicle being followed.

Further, in the above-described embodiment, an aspect is described in which as an example of the inter-vehicle information in the present disclosure, the bar graph 76 representing the inter-vehicle distance and the specified value of the inter-vehicle time, respectively is displayed on the display unit. However, the inter-vehicle information in the present disclosure is not limited to the bar graph 76, and may be, for example, information that numerically represents the inter-vehicle distance and the detected value or specified value of the inter-vehicle time, respectively.

In addition, in the embodiment described above, an aspect is described in which the second icon 74 representing the preceding vehicle of the following target is displayed on the speedometer display 58 when the inter-vehicle time control ACC is being executed by the autonomous driving ECU 34. However, in the present disclosure, it is not essential to display the second icon 74 on the display unit, and an aspect in which the display of the second icon 74 is omitted is also included in the scope of rights of the present disclosure.

In addition, in the embodiment described above, an aspect in which the speedometer display 58 is applied as an example of the display unit in the present disclosure is described, but the present disclosure is not limited thereto. For example, the display unit in the present disclosure may be, for example, the HUD 56, a display provided on a center console in a vehicle cabin, or the like.

Further, in the embodiment described above, an aspect in which the display control program 54, which is an example of the vehicle display control program according to the present disclosure, is stored (installed) in advance in the storage unit 48 is described. However, the vehicle display control program according to the present disclosure can also be provided in a form recorded on a non-transitory recording medium such as an HDD, an SSD, a DVD, or the like.

What is claimed is:

1. A vehicle display control device comprising:
a processor configured to:
acquire a vehicle speed of a subject vehicle, an inter-vehicle distance to a lead vehicle traveling in front of the subject vehicle in a traveling direction, and at least one of a specified value or a detected value of an inter-vehicle time gap, the inter-vehicle time gap being a following time required for the subject vehicle to reach a position at which the lead vehicle is present;

display inter-vehicle information indicating the specified value or the detected value of the inter-vehicle time gap and the inter-vehicle distance, at a position corresponding to a forward side of the subject vehicle represented by a first icon in the traveling direction on a display equipped in the subject vehicle, wherein the inter-vehicle information is configured such that the indication of the specified value or the detected value of the inter-vehicle time gap remains unchanged when the indication of the inter-vehicle distance varies in accordance with changes in vehicle speed;

display a graphic group in which partial graphics are arranged along a predetermined direction corresponding to the traveling direction on the display as the inter-vehicle information;

change a number of the partial graphics included in the graphic group according to the specified value of the inter-vehicle time gap; and increase the number of the partial graphics as the specified value of the inter-vehicle time gap increases.

2. The vehicle display control device according to claim 1, wherein the processor is configured to:

display a graphic group in which partial graphics are arranged along a predetermined direction corresponding to the traveling direction on the display as the inter-vehicle information; and change a total size of the graphic group along the predetermined direction according to the inter-vehicle distance.

3. The vehicle display control device according to claim 2, wherein the processor is configured such that the total size of the graphic group along the predetermined direction increases as the inter-vehicle distance increases.

4. The vehicle display control device according to claim 1, wherein the processor is configured to display a second icon representing the other vehicle at a position according to the inter-vehicle distance in the display.

5. A vehicle comprising:

the vehicle display control device according to claim 1; and a processor configured to:

receive the specified value of the inter-vehicle time gap; and control travel of the subject vehicle such that the detected value of the inter-vehicle time corresponds to the specified value of the inter-vehicle time.

6. The vehicle display control device according to claim 1, wherein a shape of the partial graphics is quadrilateral.

7. The vehicle display control device according to claim 1, wherein the processor is further configured to display the partial graphics only in front of the first icon on the display.

8. The vehicle display control device according to claim 1, wherein an area of the partial graphics decreases as the partial graphics is farther away from the subject vehicle in the traveling direction.

9. The vehicle display control device according to claim 1, wherein the processor is further configured to display the partial graphics on the display while maintaining a shape of the partial graphics.

10. The vehicle display control device according to claim 1, wherein the specified value of the inter-vehicle time is set by a driver of the subject vehicle operating a switch.

11. A vehicle display control method that is executed by a computer, the vehicle display control method comprising the steps of:

acquiring a vehicle speed of a subject vehicle, an inter-vehicle distance to a lead vehicle traveling in front of the subject vehicle in a traveling direction, and at least one of a specified value or a detected value of an inter-vehicle time gap, the inter-vehicle time gap being a following time required for the subject vehicle to reach a position at which the lead vehicle is present;

displaying inter-vehicle information indicating the specified value or the detected value of the inter-vehicle time gap and the inter-vehicle distance, at a position corresponding to a forward side of the subject vehicle represented by a first icon in the traveling direction on a display equipped in the subject vehicle, such that the indication of the specified value or the detected value of the inter-vehicle time gap remains unchanged when the indication of the inter-vehicle distance varies in accordance with changes in vehicle speed;

displaying a graphic group in which partial graphics are arranged along a predetermined direction corresponding to the traveling direction on the display as the inter-vehicle information;

changing a number of the partial graphics included in the graphic group according to the specified value of the inter-vehicle time gap; and increasing the number of the partial graphics as the specified value of the inter-vehicle time gap increases.

12. A non-transitory storage medium storing instructions that are executable by a computer and that cause the computer to perform functions comprising the steps of:

acquiring a vehicle speed of a subject vehicle, an inter-vehicle distance to a lead vehicle traveling in front of the subject vehicle in a traveling direction, and at least one of a specified value or a detected value of an inter-vehicle time gap, the inter-vehicle time gap being a following time required for the subject vehicle to reach a position at which the lead vehicle is present;

displaying inter-vehicle information indicating the specified value or the detected value of the inter-vehicle time gap and the inter-vehicle distance at a position corresponding to a forward side of the subject vehicle represented by a first icon in the traveling direction on a display equipped in the subject vehicle, such that an indication of the specified value or the detected value of the inter-vehicle time gap remains unchanged when the indication of the inter-vehicle distance varies in accordance with changes in vehicle speed;

displaying a graphic group in which partial graphics are arranged along a predetermined direction corresponding to the traveling direction on the display as the inter-vehicle information;

changing a number of the partial graphics included in the graphic group according to the specified value of the inter-vehicle time gap; and increasing the number of the partial graphics as the specified value of the inter-vehicle time gap increases.

* * * * *